Figure 1:
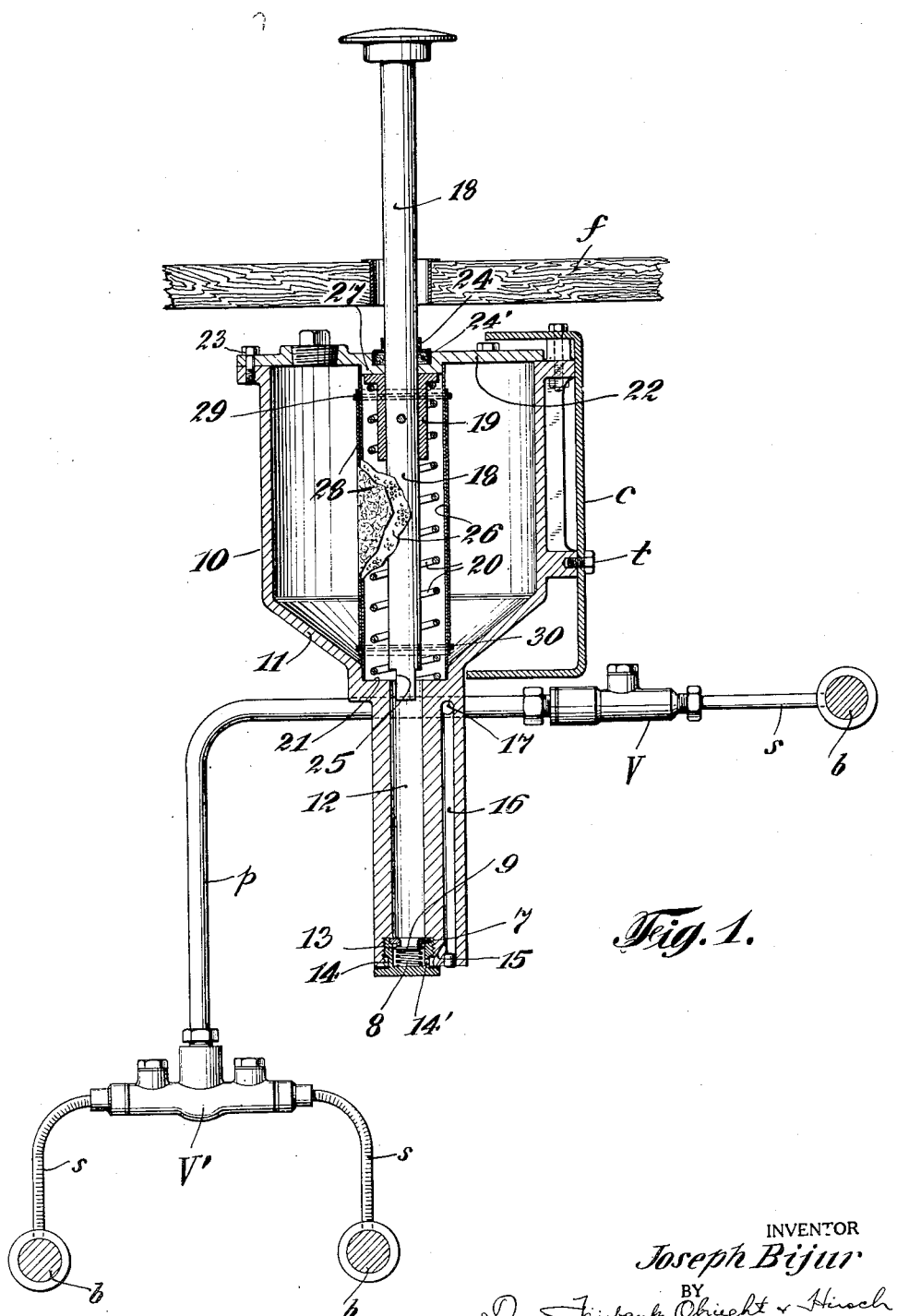

June 4, 1935. J. BIJUR 2,003,281
LUBRICATING SYSTEM AND THE CONSTITUENT PARTS THEREOF
Filed Feb. 16, 1925 5 Sheets-Sheet 1

INVENTOR
Joseph Bijur
BY
Dean, Fairbank, Obright & Hirsch
HIS ATTORNEYS

June 4, 1935.   J. BIJUR   2,003,281
LUBRICATING SYSTEM AND THE CONSTITUENT PARTS THEREOF
Filed Feb. 16, 1925   5 Sheets-Sheet 2

INVENTOR
Joseph Bijur
BY
his ATTORNEYS

June 4, 1935. J. BIJUR 2,003,281
LUBRICATING SYSTEM AND THE CONSTITUENT PARTS THEREOF
Filed Feb. 16, 1925 5 Sheets-Sheet 3
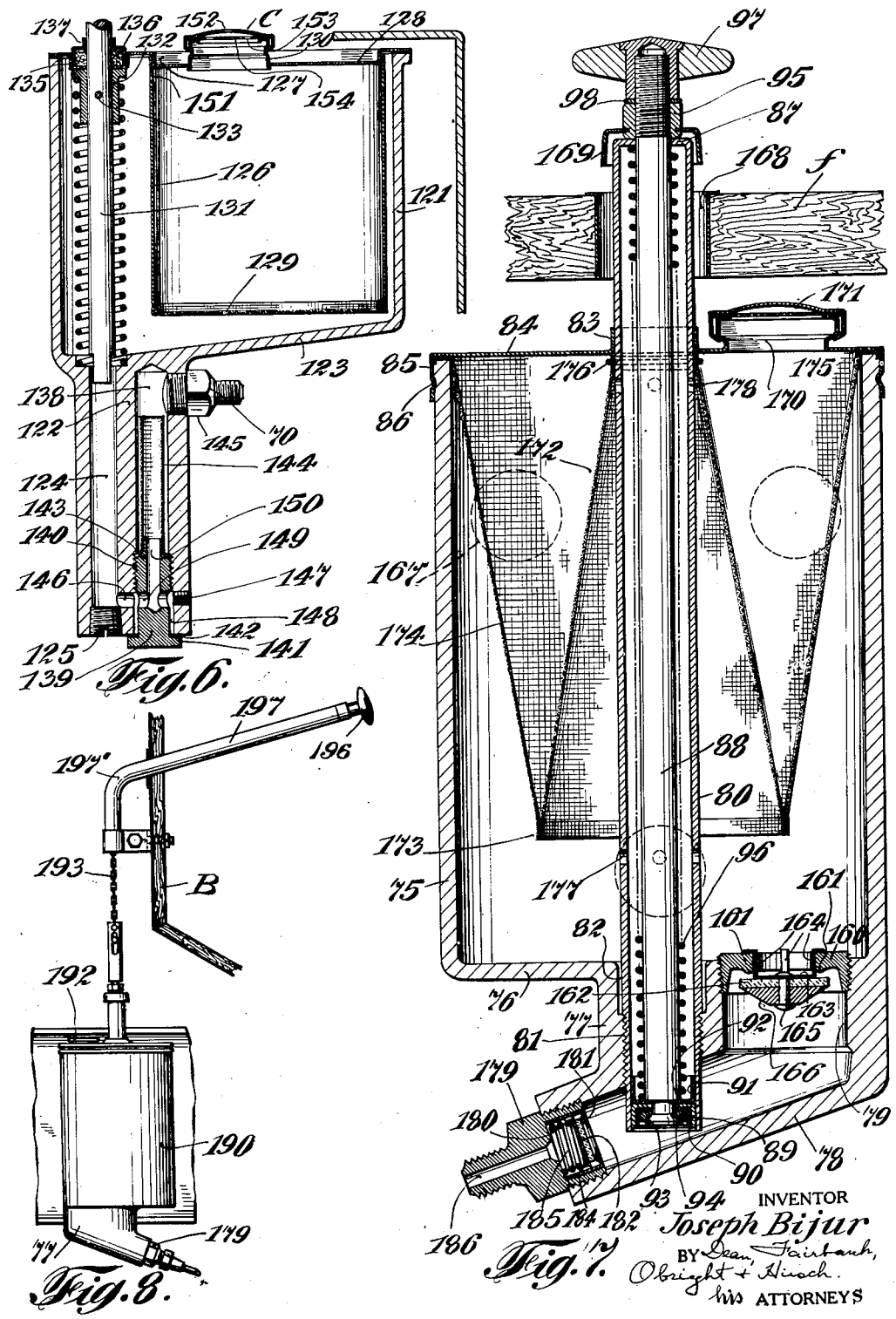

June 4, 1935. J. BIJUR 2,003,281
LUBRICATING SYSTEM AND THE CONSTITUENT PARTS THEREOF
Filed Feb. 16, 1925 5 Sheets-Sheet 4
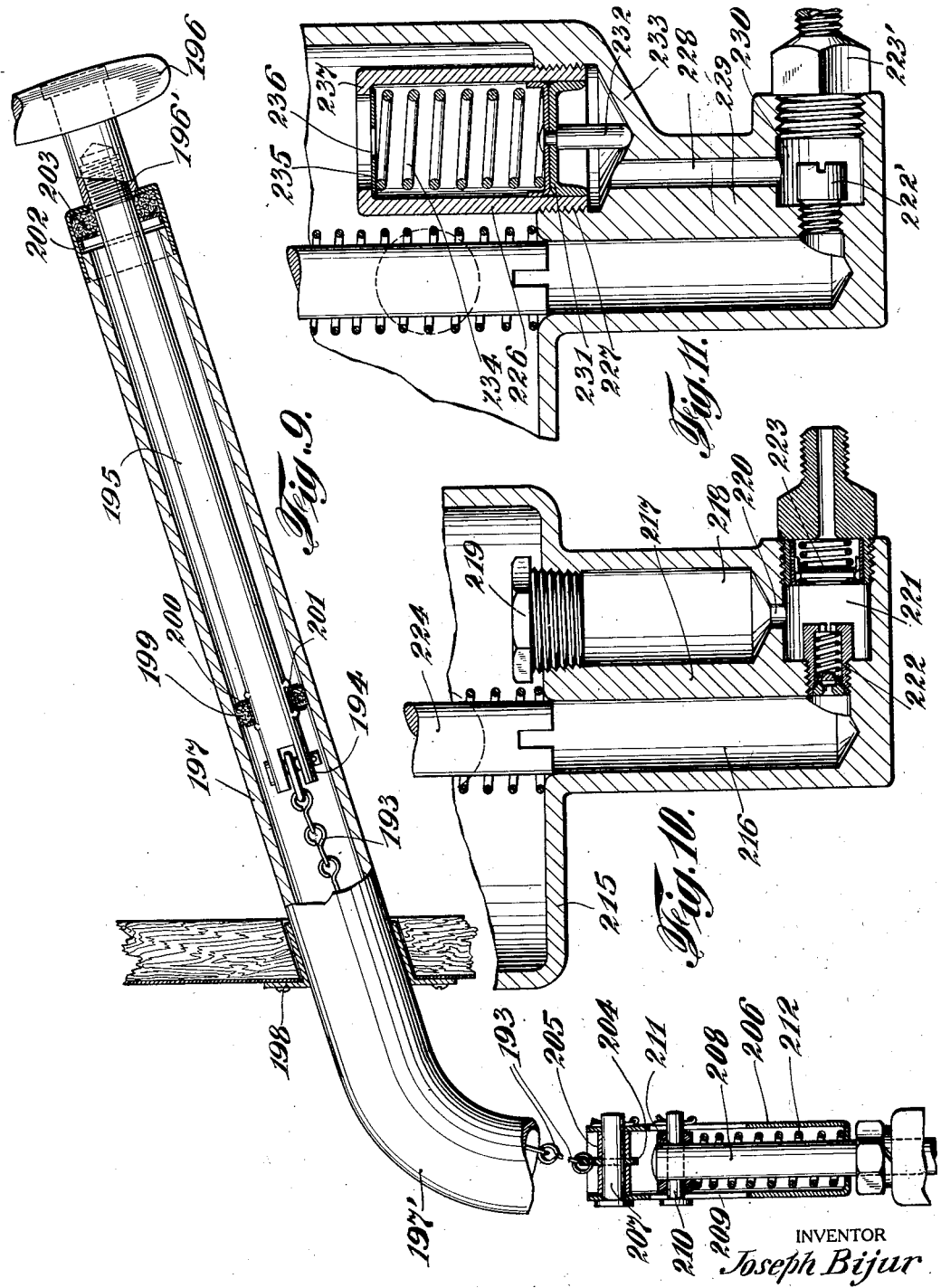
INVENTOR
Joseph Bijur
BY
his ATTORNEYS June 4, 1935. J. BIJUR 2,003,281
LUBRICATING SYSTEM AND THE CONSTITUENT PARTS THEREOF
Filed Feb. 16, 1925 5 Sheets-Sheet 5
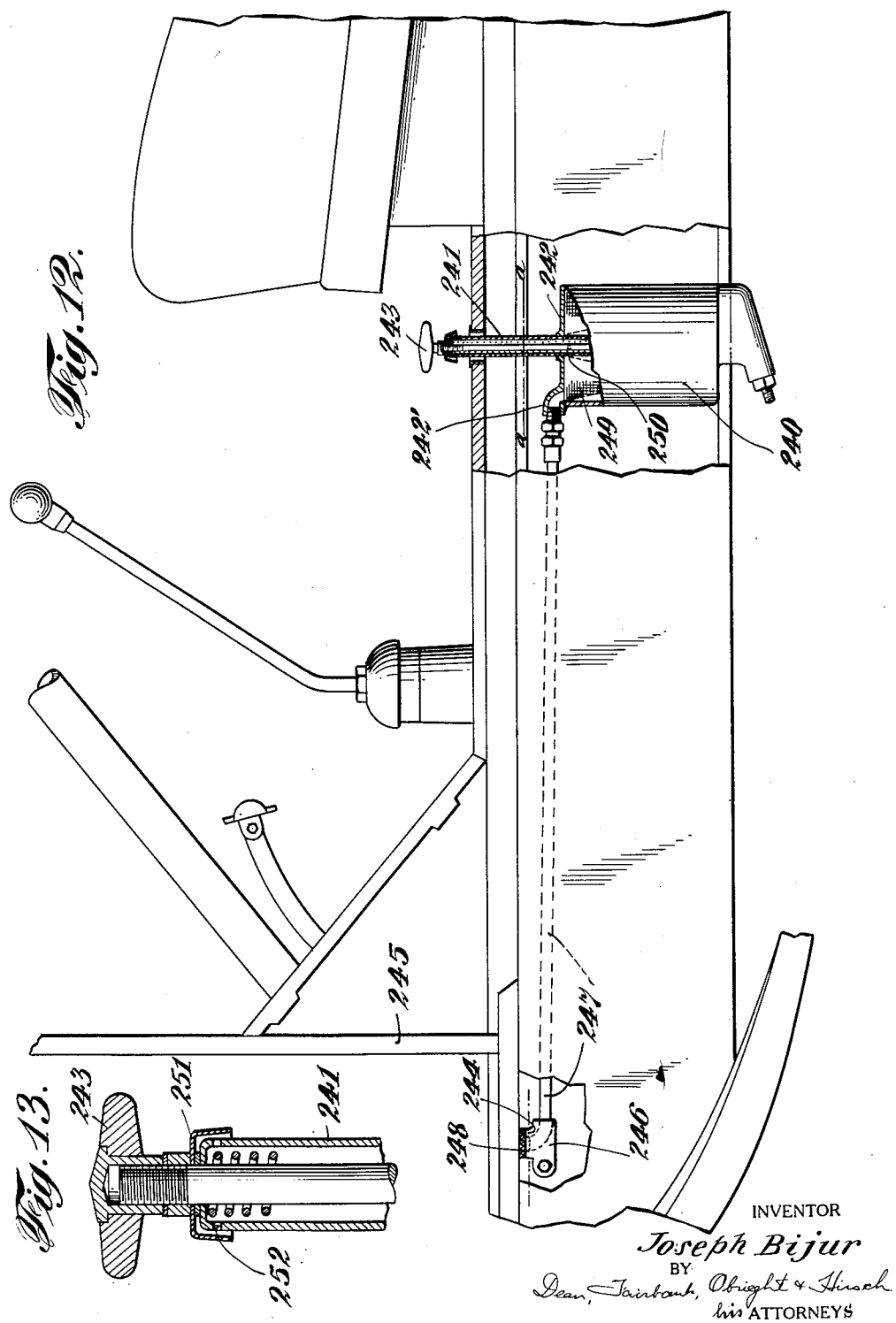
INVENTOR
Joseph Bijur
BY Dean, Fairbank, Obright & Hirsch
his ATTORNEYS Patented June 4, 1935

2,003,281

UNITED STATES PATENT OFFICE 2,003,281

LUBRICATING SYSTEM AND THE CONSTITUENT PARTS THEREOF

Joseph Bijur, New York, N. Y., assignor to Auto Research Corporation, a corporation of Delaware Application February 16, 1925, Serial No. 9,544

31 Claims. (Cl. 184—28)

My present invention relates to remote control lubrication and is concerned primarily with systems and installations and the constituent elements thereof for lubricating one or more bearings on a machine or group of machines from a readily accessible point or points of control. The invention has its preferred application to the lubrication of all or most of the bearings on the chassis of a motor vehicle, such as an automobile or a motor truck. The invention from one aspect is concerned with that type of lubricating system in which the outlet controls in advance of the various bearings are measuring valves actuated concurrently by pressure transmitted through oil-filled connecting piping, from a single centralized point of control.

It may be noted that in a system of the general type mentioned, if dirt should lodge at one of the valves in such manner as to prevent complete closing of the supply line from atmosphere therebeyond and if the pipe line also has communication with atmosphere elsewhere either at the pump, or due to looseness at another fitting or junction in the line, there is a tendency for the pipe line and even for the entire contents of a supply reservoir mounted at high level, to become drained.

It is among the objects of the invention to provide a system or installation of the type mentioned, which shall reliably deliver predetermined charges of oil at each outlet, whenever operated at the central source, without depending on any special precautions in such operation, and which shall not be subject to derangement by the entry of dirt or chips in the pipe.

To accomplish this result, I interpose in advance of the seats of the various measuring valve units, appropriate strainers, preferably each embodied with the measuring valve and serving to intercept scale or chips carried with the oil and of mechanical strength sufficient to endure the pressure thereon in the operation of the measuring valves. The strainer is sufficiently dense to intercept solid particles, but not so dense as to greatly augment the pressure at the pump required to operate the measuring valves. A filter at the pump intercepts any particles in the oil and thereby avoids the likelihood of clogging the strainers at the measuring valves.

A check valve at the outlet thereof would prevent draining of the reservoir, but on the other hand, might seriously interfere with the operation of the system, the measuring valves of which are each of the type having a measuring air bell controlled by a plunger and serving to store the charge of lubricant during the application of pressure at the pump and intended then to release the charge by spring return of the plunger in a measuring valve. The closing of a reservoir check valve after the end of the pump pressure stroke, in this case would prevent release of the pressure on the pipe line, so that the valve plungers do not return under the pressure of their springs, but remain at their outlets, the line being pressure-bound and the measuring valves not discharging for a considerable time.

It is among the objects of the invention to provide a system of the type mentioned in which while the reservoir is adequately guarded against draining, even though located at high level, the line will not become pressure bound, though measuring valves of the type last mentioned are employed. This result I accomplish by the simple expedient of providing an outlet seat of very small area for the measuring valve plunger, so that, after the plunger has been entrained to the outlet seat by the initial rush of oil in the operation of the pump and the rate of flow of oil into the measuring valve has decreased as the air bell becomes partly charged, the effective oil pressure tending to maintain the plunger against the outlet seat is so low as to be overcome by the pressure of the valve plunger return spring. The plunger thereafter floats between its inlet and outlet seats during the rest of the pump stroke and is spring-urged to the inlet seat when flow through the supply line ceases.

While with a hand charged, spring discharged pump, the manual effort of the operator is substantially the same regardless of the construction of the pipe line and of its outlets or the condition or viscosity of the lubricant, a foot or hand discharged pump may require a sustained effort on the part of the operator when the resistance to flow is high, due to small pipe, thick oil or high resistance of control fittings.

It is an object of the invention to provide a pump of manually or pedally discharged type, which shall be easy to operate even under the apparently adverse flow conditions imposed by the otherwise desirable use of pipe line of small diameter, of outlet control fittings inherently interposing high resistance to flow and by the use of oil that has become viscous by cold.

According to one feature of my invention, the manually discharged pump is provided with a pressure bell adjacent thereto, preferably embodied in a unitary structure therewith and in which the oil charge or a substantial part of the oil charge ejected by hand or foot pressure from the pump cylinder is temporarily stored, either against the compressive resistance of air or of a spring-pressed plunger, the pressure bell thereupon exerting pressure automatically sustained until the charge has been propelled through the pipe line and such pressure may endure, especially if the lubricant has become highly viscous, or if high resistance drip plug outlets are used, for a considerable interval after the manual effort has ceased.

Among other objects of the invention are to provide a centralized lubricating installation for a motor vehicle convenient from the standpoint of recharging the empty lubricant reservoir and also from the standpoint of operating the pump, yet without the need for separately mounting the reservoir and pump elements, in different locations best suited for each.

Other objects are in part obvious and in part pointed out hereinafter.

According to one embodiment, the pump is disposed below the floor board and the operating member protrudes upward thereabove directly in front of the driver's seat, the reservoir being charged through a pipe leading thereinto extending longitudinally forward therefrom and having a filling opening readily accessible from under the hood of the engine in front of the dash, and from which, dirt may be conveniently excluded.

According to another embodiment, the reservoir itself is mounted in front of the instrument board, at a place where it can readily be filled and a flexible pump operating member extends from the associated pump element thereof upward and rearward through the instrument board for convenient operation from the driver's seat.

Figure 2:
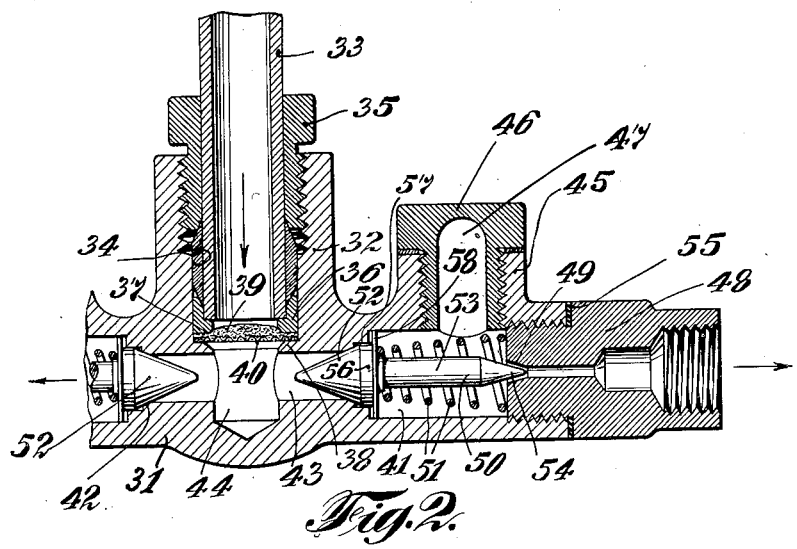
Figures 3, 4:
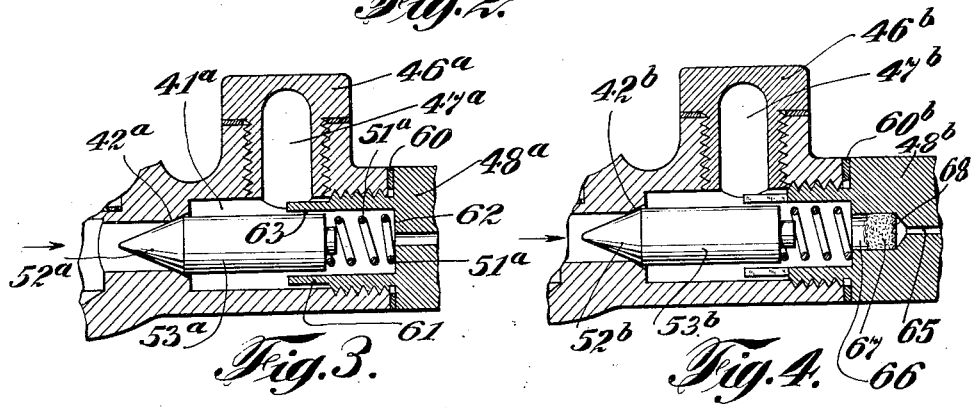
Figure 5:
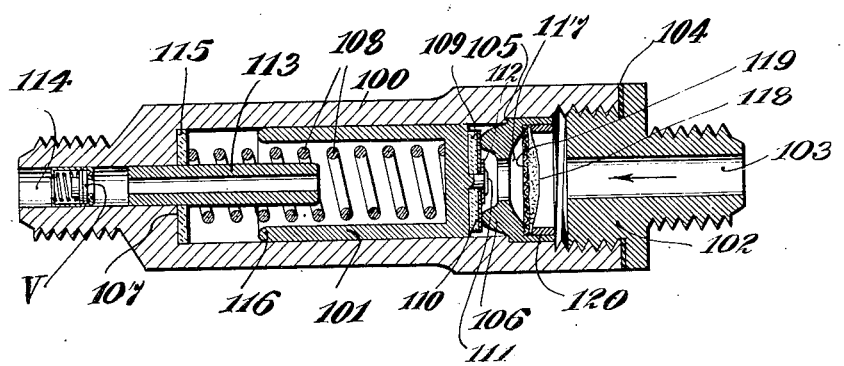

In the accompanying drawings in which are shown a number of various possible embodiments of the several features of the invention, Fig. 1 is a diagrammatic view of a lubricating installation, one embodiment of pump and reservoir being shown in longitudinal cross-section, Fig. 2 is a fragmentary view on an enlarged scale of one embodiment of measuring valve unit, Figs. 3 and 4 are fragmentary views of two modified forms of measuring valve units of the general structural type of that shown in Fig. 2, Fig. 5 is a view in longitudinal cross-section on an enlarged scale of a modified form of measuring valve, Fig. 6 is a view in longitudinal cross-section of a modified form of pump and reservoir assembly, which may otherwise be as shown in Fig. 1, Fig. 7 is a view on a larger scale in longitudinal cross-section of a spring-discharged type of pump, Fig. 8 is a diagrammatic view of another form of pump and operating handle installation, Fig. 9 is a sectional view on a larger scale of the operating handle construction of Fig. 8, which may be applied to the pumps of Figs. 1 and 7, Fig. 10 is a fragmentary sectional view of a modified manually discharged pump which may be otherwise as shown in Figs. 1, 6, 7, 8 and 9, Fig. 11 is a view similar to Fig. 10 of a modified form thereof which also may be otherwise as shown in Figs. 1, 6, 7, 8 and 9, Fig. 12 is a fragmentary view of a lubricating installation on a motor vehicle, the pump of which may be as internally shown in Fig. 7, and, Fig. 13 is a fragmentary sectional view on a larger scale of a detail of Fig. 12.

Fig. 1 indicates in longitudinal cross-section one form of pump with piping $p$ diagrammatically related thereto and supplied therefrom. A multiplicity of measuring valves V are indicated diagrammatically, each measuring valve feeding through appropriate outlets to associated bearings. One of the measuring valves, appearing on an enlarged scale at V', is illustratively shown of duplex form to eject measured charges through two outlets, each leading to a bearing $b$. The pump is shown secured by screws $t$ at channel frame $c$ below the vehicle floorboard $f$ above which the plunger 18 projects. The pipes $p$ extend along the frame and delivery conduits $s$ lead from the measuring units to corresponding bearings on the frame and on the axles, such conduits as lead to the axles being of appropriate flexibility. The present application is not concerned with the specific mode of piping or conduit layout or the specific character of flexible conduits employed.

In Fig. 1, I have shown a combined reservoir and pump comprising a reservoir casting 10 having an inclined bottom 11 from which protrudes downwardly a block integral therewith having an axial bore 12 therein constituting a pump cylinder and closed at its bottom by an appropriate screw plug 13. The plug has a disk valve 9 therein urged by coil spring 8 against seat 7 fixed in the otherwise open end of the plug. The wall of the plug has a bore 14' communicating with a peripheral groove 14 about the plug which delivers to an oblique bore 15 through the cylinder wall that, in turn, delivers to a longitudinal bore 16 in the casting, to the upper end 17 of which are connected one or more of the pipes $p$ that lead to the various measuring valves. The pump plunger 18 is provided with a flanged collar 19 against which presses a spring 20 coiled thereabout, the lower end of which is lodged in a corresponding depression 21 in the bottom of the reservoir against which it reacts. The plunger passes through a cover 22 which is bolted as at 23 to the reservoir casting and a metal bushing cup 24 with felt 24' therein further acts to guide and steady the plunger. The bottom of the plunger normally extends slightly below the upper end of the cylinder and is milled as at 25 to permit ready flow of lubricant from the reservoir into the cylinder.

In the preferred embodiment, filtering means is provided to assure the entry of clean oil from the reservoir into the pump cylinder 12. Preferably the filter comprises a perforated metal cylinder 26 encircling the plunger and its spring 20, and telescoped into the depression 21 at one end and snugly encircling a corresponding cylindrical enlargement 27 at the bottom of the cover 22. Snugly encircling the perforated cylinder is a tube 28 of appropriate filtering material secured in place thereon by clamping wires 29 and 30 at its upper and lower ends respectively.

In Fig. 2 I have shown a preferred embodiment of measuring valve unit, illustratively a duplex unit. The unit comprises a forging or casting 31 having an inlet nipple 32 which is supplied by the inlet pipe 33. The pipe is preferably secured in position in the nipple by an appropriate compression coupling which, in this embodiment, illustratively comprises a wedging sleeve 34 of relatively hard metal encircling the inner end of the pipe and a gland nut 35 threaded into the nipple encircling the pipe and pressing against the corresponding tapered end of the compression sleeve to force the opposite tapered end thereof against a reaction collar 36. The reaction collar preferably has an inturned flange 37 supported by a seat 38 in the unit and serving as a stop for the extreme end of the pipe 33. The collar 36 serves, moreover, to press against seat 38, the rim of a disk strainer. The strainer preferably comprises a disk 39 of felt having a backing 40 of fine wire mesh, which latter serves as a reinforcement and also to prevent the release of hairs from the felt, which might otherwise be carried into the valve chamber. The valve forging has barrels 41 extending from opposite ends thereof, each having a beveled valve seat 42 supplied from a corresponding bore 43 of smaller diameter, said bores branching from a well 44 into which the lubricant passes from the strainer 39. Each of the barrels 41 is provided with a lateral nipple 45 closed by a plug 46 threaded thereinto and hollow as at 47 to afford an air cavity or reservoir. Each of the barrels is closed at its delivery end by a screw plug 48 threaded thereinto and affording a beveled valve seat 49. Means is provided which controls the flow of lubricant from the pipe to the reservoir bell 47 and from the reservoir bell to the bearing, comprising a double-ended plunger 50 urged by a coil compression spring 51 thereabout, which reacts against the inner end of the plug 48 to seat the tapered end 52 thereof against valve seat 42. In the preferred embodiment, the shank 53 of the valve is of diameter materially smaller than the head 52 and has a tapered end 54 of still smaller diameter, to coact with the beveled seat 49 in the plug 48 and afford a seating surface thereat of very small area. Preferably the stroke of the valve plunger is in the order of but a few thousandths of an inch. The plug 48 has a suitable compressible gasket 55 interposed therebetween and the barrel end, by which its axial position, and, accordingly, the length of stroke can be delicately adjusted. Preferably the valve head 52 has a short cylindrical portion 56 extending with small clearance in the corresponding cylindrical portion 57 of the chamber and adjacent said cylindrical portion, I preferably press-fit a ring 58 about the shank 53, which affords but small clearance with respect to the wall of the main length of barrel.

In use, it will be understood that the entire pipe line will normally be filled up to the various valve seats 42 at the various units. The pump barrel 12 will normally be filled with clean oil which has previously passed through the filter 28 by gravity flow, to some extent by suction due to the partial vacuum in the cylinder created when the pump plunger withdraws to the upper position shown. The mere depression of the pump plunger will now effect a measuring of charges at the various valves and automatic delivery to the associated bearings. In this operation, the spring 20 is compressed and the pressure of the plunger is transmitted throughout the pipe line and applied at the various valves V, the plungers 50 of which are propelled with the initial rush of oil through their short stroke to unseat at their inlets and to cause the small tapered ends 54 thereof, to seat at the outlets 49. This action takes place positively and promptly, especially as the valve 53 has but minute clearance at its inlet end and the annular area of the disk 58 is interposed in the path of liquid flow. The seated plunger prevents escape of lubricant therebeyond, and, accordingly, the air bell 47 becomes charged as oil is admitted to the measuring valve unit, in the continued application of pressure at the pump. As the pressure in the bell rises, the rate of oil flow past the valve plunger becomes less and the pressure urging the plunger 53 against its seat 49 is substantially only the hydrostatic seating pressure in the pipe line exerted upon the small effective area of seat 49. Spring 51 overcomes this relatively small pressure and the plunger, accordingly, floats between its inlet and its outlet seats during the continued application of pressure at the pump, affording a restricted outlet to the bearing for lubricant forced about the floating plunger during the rest of the pump stroke. The outlet port 49 being highly restricted during this operation, offers a resistance to oil flow high compared to that of the length of pipe line and of the strainer and, accordingly, there will be no disproportionately great emission at bearings near the pump. After the pump plunger has reached the end of its stroke and the foot is removed therefrom, the relief valve 9 reseats, the flow of oil through the pipe line ceases and the spring 51 then returns the valve plunger to its inlet seat as shown in Fig. 2. Thereafter the air in bell 47 expands and ejects the lubricant to the bearing past the now open outlet seat.

It will be understood that if the effective seating area of outlet 49 were so large that the total hydrostatic pressure thereon in operation exceeds the pressure of a plunger return spring 51, of otherwise practicable characteristics, the system would become pressure-bound for a considerable period, unless relief valve 9 were omitted from the pump, and venting or relief of the pressure on the line were, therefore, effected at the pump, or some other special venting or relief means were provided.

While only clean oil is admitted to the line by reason of the interposition of the filter 28, any scale entrained by the oil in the pipes or any chips admitted to the pipes in the process of applying the various fittings thereto would be intercepted by the strainer disks 39, so that the lodging of any such solid particles at the seats and the resultant impairment of valve plunger operation is precluded. The valve 9 being normally seated precludes the possibility of completely draining the reservoir should the pipe line break, or should a measuring valve fitting be injured.

In the construction described, the operation would, nevertheless, be reliable even should one or more of the measuring valve plungers fail to move through the entire stroke during pump plunger actuation and to effectively close the beveled outlet seat 49. By reason of the minute stroke of said plunger, in the order of but a few thousandths of an inch, should such valve only crack off its seat 42 upon the application of pressure, there would be provided between the tapered end 54 and the corresponding beveled seat 49 an annular port, but minute in effective area, as heretofore described, and said port would impose a resistance to flow, so high under the pressure transmitted from the source that lubricant would pass therethrough but slowly. Accordingly, in such operation, a relatively small predetermined quantity of lubricant would pass directly from the pressure source past outlet 49 to the bearing, the rest entering the bell 47 and compressing the air therein, as in normal operation. Substantially only the measured quantity would pass to the bearing supplied from such valve, part directly during pressure application and the remainder after the foot has been removed from the plunger and the air bell has begun to eject.

The mode of operation last described might occur, if, for instance, a particle of dirt became lodged at the outlet seat 49, which might take place if strainer 39 were omitted. Thus, with my measuring valves, affording but a minute plunger stroke and providing a small outlet valve seat, accurate distribution of lubricant from the various outlets would occur even if the strainer 39 were omitted, provided that the various measuring valves were disposed at uniform level so that drainage of the pipe line would not occur even if particles of dirt should prevent the plungers or some of them from seating normally at their inlet heads 52. I prefer, however, the specific arrangement shown and described including the strainers by the use of which the limitations as to relative levels of measuring valves, level of reservoir, etc. are removed.

In Fig. 3 I have shown an embodiment of measuring unit which includes a high resistance outlet port functioning throughout the operation of each unit. In the drawings, similar parts bear the same reference numerals as in Figs. 1 and 2 with exponent "a" however. The outlet closure plug 48a in this case is seated in substantially fixed position, an ordinary gasket 60 being used instead of the special gasket shown in Fig. 2. An integral tubular extension 61 is provided on the plug 48a of internal diameter but a few thousandths of an inch larger than the shank 53a of the bullet-shaped valve plunger, a considerable portion of the length of which at all times extends into said tubular extension. The main length of the valve plunger is preferably cylindrical and provides no valve at its outlet end and the tapered end 52a thereof is normally pressed against the beveled seat 42a at the inlet end by a coil spring 51a reacting against the shoulder 62 in the plug. Preferably, the spring 51a is of strength such that in normal application of pressure at the pump, the valve plunger 53a will crack but slightly off its seat. The lubricant that enters the valve chamber 41a will divide, some passing under the applied pressure into the bell 47a, to compress the air therein and some being forced through the high resistance minute cylindrical crevice 63 between the shank 53a and tubular extension 61, to pass directly to the bearing. During the progress of the pump stroke, as the air in the bell 47a becomes compressed and the resistance of said bell to the entry of more oil increases, the proportion of lubricant forced through the restricted outlet 63 increases.

Thus, it will be seen that with the use of fittings as shown in Fig. 3, whether all of the fittings on the line are of that type or whether only some are of that type and the rest of other types herein disclosed, the operation is entirely reliable and no excess of lubricant will be forced to one bearing at the expense of lubricant intended for other bearings on the line.

While in the embodiment of Fig. 3, the restricted outlet bore is determined by the gap between the plunger and an encircling wall, I have shown in Fig. 4 an alternative embodiment in which the restricted outlet of the valve is independent of the plunger. In the fragmentary embodiment shown in the drawings, similar parts are designated by the same reference numerals as in Fig. 2 with exponent "b" however. In this construction, the valve may be generally similar to that shown in Fig. 3, and the outlet plug 48b has a minute longitudinal drip bore 65, for instance, one made with a #80 drill, and of .0135 inch diameter, and of length sufficient to interpose a high resistance to flow. As an additional safeguard, to avoid the possibility of such minute drip bore becoming clogged with a particle of dirt or a chip, it is preferred to provide in advance thereof in a socket 66, a felt strainer plug 67 which as in other embodiments, may be backed with a disk 68 of fine mesh metal screen.

In Fig. 5 is shown an alternative form of measuring valve, which while it may be substituted for some or all of the measuring valves shown in Fig. 1 and in the places where these are located, is much smaller in exterior dimensions and is, accordingly, suitable for application directly or in proximity of the corresponding bearings, so that the pressure from the source can be conveyed the entire distance to said bearings. A preferred form of valve includes a fitting comprising a barrel 100 within which slides a cup-shaped piston 101 providing small clearance. The inlet end of the barrel is closed by a plug 102 having an axial bore 103 and tightened by an interposed gasket 104. Press-fitted within the bore of the barrel and against a shoulder 105 therein is a seat member 106 for the valve 101. At the outlet end of the barrel, there is provided a shoulder 107 against which reacts a coil spring 108 which extends into the hollow of the cup-shaped piston and urges the latter against the seat 106. For effectiveness of seating, the plunger is provided with a coating of vellumoid 109 faced with oiled silk 110 or the like. A small axial protrusion 111 on the valve is riveted over against a washer 112 to maintain the plunger parts assembled. Preferably the spring 108 is maintained against bowing laterally by a length of pipe 113 press-fitted into the outlet bore 114 of the fitting and extending longitudinally as a core within the spring 108 and partly into plunger 101. Preferably, also said spring presses against a disk 115 of vellumoid at shoulder 107 which serves as a seat for the rounded rim 116 of valve 101 in pressure operation.

The valve seat 106 is countersunk as at 117 at its inlet end to afford space for a strainer comprising a disk of felt 118 backed by wire mesh 119 and secured in position by a split ring 120. In operation, pressure from the source is transmitted through the strainers of each of the various measuring units on the line, and effects a propulsion of the piston 101, against the resistance of spring 108 throughout the stroke until the rim 116 thereof seats against vellumoid seat 115 in which position the inner end of pipe 113 will still be spaced from the inner end or bottom of the plunger cup. Lubricant that had been trapped in the unit is by this operation expelled under pressure through the pipe 113 to the bearing. In the continued application of pressure, after the piston has completed its stroke, lubricant will not work past the piston since the latter is then effectively seated and sealed with respect to the outlet by the vellumoid seat 115. When the foot is now taken off the pump plunger and the pressure on the line is thereby released, the spring 108 expands and slowly urges the piston 101 to the position shown in Fig. 5, while oil passes through the clearance between the barrel and the wall of the piston from the line into the measuring chamber until the valve is pressed against its seat 106 in which position, it prevents exit of lubricant from the pipe line in advance thereof until pressure is again applied. A relief valve V similar to valve 9 in Fig. 1 is disposed preferably at the bearing end of each fitting, although it may be disposed at the inlet end or in advance thereof, if desired. The relief valve serves to prevent the plunger 101 in its return from sucking oil previously discharged or air back into the measuring chamber from the bearing. The relief valves V in the system also preclude the piston from raising the column of lubricant in the pipe ahead of it, so that lubricant is compelled in the piston return to pass around said piston in order to refill the valve chamber, as heretofore described.

The strainer 118 performs the same function as in Fig. 2 to prevent the entry of chips or scale from the pipe line to the seat of the measuring valve.

Substantially the full pressure applied at the outer face of the piston base is effective to propel the piston toward the outlet end and to maintain it seated thereat, since the pressure is not offset by any back or reverse pressure which would result were there effective communication established from the source of pressure to any part of the reverse face of the piston.

In Fig. 6 is shown a form of pump alternative to that shown in Fig. 1. This pump consists of a reservoir 121 having a block 122 cast integral with the bottom thereof, and in this embodiment, at one side of the bottom, said bottom sloping as at 123 so that lubricant will readily flow into the pump barrel 124 which is bored longitudinally of said block and is sealed by a plug 125 at the lower end thereof. The filtering of the oil is effected prior to its entry into the pump barrel by a filter cup having a sheet metal side wall 126 friction-fitted over a corresponding annular depression 127 in the cover 128 for the reservoir. The bottom of said filter cup carries a cap 129 of filtering material press-fitted thereinto. The cover has a filling neck 130 over the filter and closed by a removable spring cap C through which the oil is poured in replenishing the reservoir.

The pump plunger 131 is similar to that shown in Fig. 1. A flange collar 132 encircles the plunger and is maintained in place thereon by a pin 133 transversely therethrough. The cover is provided with a depression 135 within which fits packing material 136 held in place by a cap member 137 press-fitted into said depression and encircling the pump stem. Laterally of the pump bore 124 is a filter chamber 138 comprising a longitudinal bore in the block 122 parallel to bore 124 closed at its lower end by a plug 139 screw-threaded thereinto as at 140 and provided with a flange 141 pressed through an intervening gasket 142 against the bottom of the block. At the reduced inner end 143 of the plug 139 there is mounted a cup-shaped filter 144 telescoped thereover and extending substantially the length of the filter chamber. The outlet from the pump reservoir unit leads to the pipe or pipes (not shown) through a valve 70 similar to that shown at 9 in Fig. 1. Communication from the pump outlet to the filter chamber is effected by a horizontal bore 146 through the block immediately above the plug 125, formed by drilling diametrically across the filter chamber and subsequently plugging as at 147. The plug 139 has an annular groove 148 intervening between the threaded part 140 and the flange 141, to which said bore 146 delivers, said groove, in turn, communicating with a bore 149 through the plug 139, delivering to a longitudinal bore 150 partway through said plug.

To adequately vent the unit, I prefer to provide a vent hole 151 near the top of the filter cup, a control aperture 152 in the outwardly-bowed spring cap c, and a number of apertures 153 out of alignment therewith in the flat vellumoid seating cap 154 enclosed in the sealing cap. Thus it will be seen that the air will readily enter through aperture 152 and apertures 153 to the filter cup and thence through aperture 151 to maintain the entire pump unit vented. The apertures 152 and 153 being out of alignment, there is no danger of dirt dropping from the exterior into the filter, or of oil splashing out therethrough.

In operation, oil passes through filter 129 by gravity flow into the reservoir and thence into the pump cylinder, whereupon it is forced in operation of the pump plunger through the filter cup 144 to the line. Filter cup 139—144 is easily removable from the device for cleaning or replacement when desired. Filter plug 139 can be cleaned by sloshing in a bucket of kerosene.

In Fig. 7 is shown another embodiment of reservoir and pump assembly. A cast reservoir 75 is provided with a bottom 76 cast integral with a central hub 77 extending therebelow and communicating with an oblique conduit 78 also cast integral with the reservoir, the upper end of which oblique conduit extends vertically upward as at 79 to provide a circular opening in the bottom of the reservoir. A pump cylinder 80 extends longitudinally and axially of the reservoir and is threaded as at 81 in the lower part of the hub 77 which has an enlarged piloting bore 82 above the threaded region, the lower end of the pump cylinder protruding into the conduit 78. The pump cylinder is positioned at its upper end by an integral hub 83 on the sheet metal cover 84, the flange 85 of which has a bead 86 spun into a corresponding peripheral groove in the reservoir wall. The pump cylinder is open at its lower end and is formed with an integral head 87 at its upper end through a central aperture of which extends the piston rod 88. The piston may be of any suitable construction, but in the preferred embodiment shown, it comprises a leather cup 89 extending downward to the open end of the cylinder and backed by a metal cap 90, a complementary metal cup 91 being provided, the bottom of which is pressed against the end of cup 89 and the flange of which is opposed to the flange of cup 89. The piston has a shoulder 92 against which the cup 89 is pressed, the reduced free end of said piston being upset as at 93 against a correspondingly recessed metal washer 94 within cup 90, thereby completing the assembly.

At the upper end of the piston rod is threaded a nut 95 which is normally urged into contact with the cylinder head by a coil spring 96 having a multiplicity of turns under substantial compression even in its most distended state and encircling the piston rod 88 and pressing at its lower end against the piston cup 91. An operating handle 97 is threaded at the extreme end of the piston rod above the nut 95 and presses upon lock washer 98.

An air venting valve is mounted in the open end of conduit 79 at the bottom of the reservoir. Said valve comprises a metallic holder 160 threaded in place thereinto and having a downwardly directed valve seat 161 and a disk valve member 162 preferably of suitable yielding material, such as vellumoid is normally suspended below said valve by a sheet metal spider 163 having a plurality of fingers outwardly directed as at 164 and resting on top of the valve, said sheet metal member secured to the vellumoid seat by a rivet 165 which also maintains against the lower end of the seating member, a generally conical button 166.

In the present embodiment, I have shown lugs 167 cast integral with the reservoir wall, by which it may be secured, for instance, within the flange of the side frame of the motor vehicle, the pump handle protruding upward through the floorboard f at an aperture 168 therein. In order to prevent the entry of dirt, dust or water through the slide joint between the piston rod and the cylinder head, I have found it effective to provide a sheet metal hood 169 extending about the nut 95 and rigidly secured thereto in any suitable manner, said hood having a flange extending over the head of the cylinder and thus directing any dirt, dust or water to drop downward from below the cylinder head.

The filling neck 170 may be provided as an integral part with the cover and closed by a removable spring cover 171 of any suitable type, for instance, a duplicate of that shown in Fig. 6.

A preferred form of filter comprises a generally frustro-conical member 172 of appropriate fabric encircling the pump cylinder at its upper and reduced end and stitched by a seam 173 at its lower or wider end to the lower and narrow end of an outer frustro-conical filter member 174 which diverges outwardly and upwardly to substantially the diameter of the reservoir itself, the upper rim 175 of said filter being clamped in position against the rim of the reservoir by the cover 84. A spring ring 176 encircles the upper innermost part of the filter to secure it in place about the pump cylinder. In the preferred embodiment, the pump cylinder is provided with small apertures 177 at a level above the bottom of the reservoir and with further apertures 178 at a level slightly below the top of the filter.

At the outlet end of the conduit 78, I preferably dispose a check valve, which in the present embodiment, comprises a nipple 179 threaded into the end of the reservoir outlet into which is friction-fitted a sheet metal valve seat bushing 180 having a curved valve seat 181. A disk valve 182 having a vellumoid seat and a sheet metal backing with guide fingers 184 slidable in the bushing 180 is pressed against the seat 181 by a coil spring 185. The reduced outlet aperture or bore 186 through the nipple communicates with the piping system.

In order to fill the reservoir, the snap cover 171 is removed and the lubricant is poured through the filling neck 170. In this operation, the lubricant passes slowly through the filter 172—174 to the bottom of the reservoir, which is vented at cover 171, part of said lubricant passing the valve 162 and filling the oblique conduit 78. When the lubricant is up to the level of apertures 177, communication is made therethrough with the pump cylinder, which will thus normally contain lubricant to the same level as in the reservoir, the pump cylinder being effectively vented through the upper apertures 178.

In operation, the pump handle is grasped at knob 97 and withdrawn, preferably as far as it will go, until spring 96 is compressed to a column spring, whereupon the knob is let go. In the withdrawing operation, lubricant is sucked from the conduit structure 78 into the lower end of the pump cylinder, any lubricant above the piston returning to the reservoir through apertures 177 and if the level of the lubricant in the reservoir is quite high, some will return into the reservoir through the upper apertures 178. When the pump handle is let go, the compression spring 96 forces the piston downward, urging the valve 162 upward against its seat 161, so that it will sustain the pressure of the lubricant exerted at the pump, said pressure overcoming the resistance of the check valve spring 185 and effecting emission of lubricant through the port 186 at a rate determined by the character of outlet control fittings, the length of pipe line in the piping system and the character of the lubricant used.

The unit shown in Fig. 7 may be employed in a centralized lubricating system embodying outlet control measuring valve fittings of the type shown in Figs. 2, 3, 4 or 5, the operation of which measuring valve units would proceed in the manner heretofore described. The pump being manually charged, the effort required in operation would be substantially the same, regardless whether the resistance to oil flow in the line is high, as, for instance, due to the use of small pipe, thick oil or of high resistance control fittings. The pump unit of Fig. 7, accordingly, lends itself readily to the use of drip plugs fittings devoid of volumetric compartments, such, for instance, as shown in my copending application, Serial No. 662,195, filed Sept. 12, 1923, which drip plugs may be used, if desired, at some bearings, concurrently with the use of measuring valves for other bearings. The present reservoir and pump assembly of Fig. 7 constitutes an improvement effecting economies with respect to those shown in said copending application, in which latter application, generic claims to this subject-matter are now pending.

The discharge operation proceeds until the stop nut 95 is arrested by the cylinder head 87, when the pump discharge is completed. The check valve 182 is, thereupon, returned to its seat by its spring 185 and while thus seated between operations, it prevents the possibility of draining the reservoir, should any one or more of the control fittings in the line or any part of the length of the line become defective. It will be seen that the piston 89 is at all times primed since even if the level of the lubricant in the reservoir is quite low, said piston will be immersed in oil.

Should the level of oil in the reservoir be so low that a full pump charge cannot be drawn when the piston is actuated, or should the oil be entirely exhausted from the reservoir, air would be drawn into the cylinder, which the piston would eject in its return stroke. Such air charge would, however, exert a pressure insufficient to raise and seat the valve 162, the air readily by-passing through the conduit 78 about the rim of the valve 162 back into the reservoir. Accordingly, when the pump is operating on air, pressure would not build up to the extent of unseating the check valve 182 and air cannot be forced into the pipe line system. The operation of the system would accordingly, not become impaired, as it would if air bubbles became imprisoned in the line.

To obviate the need, involved in the embodiment of Fig. 7, for removing the floorboard preparatory to refilling the reservoir, I have shown an alternative embodiment in Figs. 8 and 9 in which the reservoir is disposed in a place more accessible for filling, but less accessible for pedal operation, special operating instrumentalities being provided to permit ready actuation of the pump. In the embodiment shown, the reservoir and pump unit 190 which may be identical with that shown in Fig. 7, is shown mounted in front of the instrument board B against one of the channel frames. The filling cup 192 is, therefore, readily accessible when the engine hood is raised and there is no need for removing any part of the structure.

The free end of the pump piston is connected by means to be hereinafter described, preferably including a chain 193 connected at its rear end to the bifurcated end 194 of a plunger 195, having a pull knob 196 accessible from the driver's seat. Preferably the chain 193 and plunger 195 extend through a rigid guide tube having a straight section 197 extending through the instrument board and a curved part 197' protruding forward therefrom, said tube secured in place by a flanged collar 198. For ease of operation the pull-rod 195 is afforded a slide fit in the guide tube by means of a compression bearing ring 199 encircling the same and held in place by a metal bushing 200, secured in place by upsetting the metal of the rod as at 201 at opposite sides thereof. The outer end of the tube 197 is provided with a sheet metal head 202 pressed thereover and enclosing an annular mass 203 of yielding material, acting as a gland for rod 195, and as the stop for the shank 196' of operating knob 196.

While the chain may be connected directly to the end of the pump piston rod, this arrangement may involve either the difficulty of making the chain of the exact length to draw the shank 196' against head 202 when the pump is completely discharged, or the need for providing slack in the chain and consequent rattle while the vehicle is in motion. To remedy these objections, I have provided a simple arrangement, whereby the chain is necessarily drawn taut against rattling at all times, so that small variations in the length of the chain are readily accommodated. The pump end of the chain 193 is secured at an eye 204 clamped between two short lengths 205 of a bushing held by a transverse pin 207 in a sheet metal cage 206 encircling the protruding end 208 of the pump piston and having elongated slots 209 in the sides thereof, in which travel the ends of a pin 210, which is rigidly fixed transversely of the piston rod and preferably also serves to secure a metal bushing 211 about the end of the rod against which reacts the end of a coil spring 212 encircling said rod end, the lower end of which presses against the bottom of the cage 206.

The mode of operation of the construction described will be apparent. It may be briefly noted that normally the device assumes the position shown in the drawings in which the spring 212 is expanded and urges the cage 206 downward so that the pin 210 is between the ends of slots 209. The cage 206 accordingly draws the flexible tension member 193 downward to urge the shank 196' of knob 196 against the end of the guide cylinder 197. Thus, the chain is normally maintained taut against rattling. In pump operation, when the knob is drawn outward, tension is transmitted through the chain to raise the pin 207 and the cage 206 thereby compressing the spring 212 until the lower ends of slots 209 contact the cross pin 210 and thereafter in the continued pull on the knob 196 as will be apparent, the cage 206 will elevate the pump plunger 208, charging the pump until the end of the stroke is reached. As soon as the handle is now let go, the spring 212 expands, drawing the cage 206 downward as far as it will go, transmitting tension through the pin 207, the chain 193 and the operating knob 196 until the operating knob shank 196' contacts head 203. At this time, cross-pin 210 will be near the upper ends of slots 209. The discharge of the pump proceeds independently of the return of the operating member, the cross-pin 210 of the pump rod during this discharge, descending within the slots 209 of the cage 206.

In Fig. 10 is shown a desirable alternative means for temporarily storing near the reservoir, part or all of the lubricant charge under the pressure generated by the pump, for subsequent delivery through the outlets. This arrangement is particularly useful with a hand or foot discharged pump used to supply a system which, because of the character of line or of the outlet fittings or of the lubricant used, may impose a resistance greater than can be comfortably overcome by the hand or foot. In the embodiment of Fig. 10, the reservoir casting 215 is provided with the pump cylinder bore 216 in the integral block 217 below the reservoir. Laterally of said pump cylinder the block is provided with a pressure bell or cylinder 218 closed at its top by a screw plug 219 inserted from within the reservoir. The bell 218 has an inlet 220 at its lower end through which it is charged from a generally cylindrical cavity 221 therebelow which is supplied from the bottom of the pump cylinder through an interposed check valve 222 and which delivers through a relief valve 223 to the pipe line (not shown). The check valve 222 may be of any suitable construction and the embodiment shown comprises a fitting similar to valve 9 in Fig. 1, threaded into the casting from the outer end of the cavity 221. The relief valve 223 at the outlet end of the chamber 221 and which has a seating pressure greatly in excess of that of check valve 222, may be of the same construction as that shown in Fig. 7. The pump shown only in a fragmentary view, is preferably provided with a filter such as that shown in Fig. 7.

By the construction disclosed, although the pump plunger 224 is pushed downward by a single relatively sudden stroke, yet effective pressure may be sustained on the line for a considerably longer period by reason of the energy temporarily stored in the bell 218 and released at a slower rate than that at which it is introduced. Specifically, in operation, when the pump plunger is depressed, the check valve 222 opens and the charge will enter the pressure bell 218 substantially compressing the air therein, and after the pressure has risen beyond that required to unseat relief valve 223, oil will proceed to the line. Thereafter, the air in the pressure bell in expanding will maintain a sustained pressure on the line and continue supplying the bearings through the outlet fittings, until the pressure has dropped to a point where it can no longer overcome the seating pressure of relief valve 223, whereupon the latter closes.

Thus, even if the lubricant becomes highly viscous in winter, and with the use of fittings involving minute restrictions, that interpose high resistance to flow, the pump plunger can be readily depressed by the foot, charging bell 218, which exerts a pressure, sustained until the desired charges have slowly oozed past the control fittings. By the arrangement set forth, moreover, even though the pressure applied during the foot stroke varies from the beginning to the end of the pump stroke, yet the pressure lubricant upon transmission to the line is at all times above the predetermined relatively high minimum imposed by the relief valve 223.

In Fig. 11 is shown an alternative embodiment generally similar to the arrangement of Fig. 10 but including instead of an air bell, a pressure chamber embodying a piston. In this arrangement, the same general type of casting is employed as in Fig. 10, but instead of disposing the pressure bell as an integral part of the block, a cylinder 226 is threaded into place as at 227 from above the bottom of the reservoir. The pressure bell 226 is supplied from a duct 228 longitudinally of the block 229 which, in turn, is supplied from the cylindrical cavity 230 corresponding to cavity 221 in Fig. 10. The cylinder 226 includes an appropriate tight fitting piston 231, the outermost position of which is determined by a pin 232 axially thereof, the end of which is normally urged into a conical depression 233 in the reservoir bottom by a coil compression spring 234 within the bell, which reacts against a metal plate 235 perforated as at 236 and held in position by an inturned flange 237 at the upper end of the bell 226.

In the embodiment shown, it will be seen that lubricant from the reservoir will normally fill the pressure bell 226 above piston 231, and thereby effectively maintain said piston 231 primed or submerged in oil, so that it will operate efficiently. When the pump is actuated, it will be understood that lubricant will be forced past check valve 222' (identical with valve 222 in Fig. 10) into the pressure bell 226, pushing the piston 231 upward against the compression of spring 234, lubricant above the piston readily returning to the reservoir through aperture 236. After the spring has been placed under a compression in excess of that of the spring which maintains seated the relief valve 223' (identical with valve 223 in Fig. 10) the expansion of said pressure bell spring will effect propulsion of the lubricant into the piping system in a manner substantially identical with that described above in connection with Fig. 10.

In Figs. 12 and 13 is shown an arrangement to permit refilling a lubricant reservoir mounted under the floorboard, without need for removing the latter. I have in this figure shown a fragmentary view of the vehicle, with the reservoir 240, which may be substantially of the construction shown in Fig. 7, mounted under the floorboard. The pump cylinder 241 extends well above the reservoir cover 242 and above the floorboard and the pump plunger therein has an operating knob 243 accessible from the driver's seat. In this embodiment, the reservoir is recharged through a filling opening 244 in the flange of the channel frame in front of the dashboard 245, said filling opening comprising an angle fitting 246 riveted or otherwise secured to the channel frame and communicating through a downwardly inclined length of pipe 247 rearward to a nipple 242' cast integral and extending above cover 242. The inlet to the filling opening is normally closed by a removable tight filling cap or plug 248. The filter 249 is shown clamped as in Fig. 7 under the cover 242. In addition to the apertures 250 in the pump cylinder below the cover 242 there are provided near the head of the cylinder 241, vent holes 252 which are normally encircled by the flange of hood 251, so that dust or dirt will not readily enter therethrough, hole 252 being at a level above that of the filling opening 244 equal at least to the length of pump stroke.

To refill the tank, the plug or cap 248 is removed and lubricant is poured through the aperture, flowing downward through inclined pipe 247 into the filter 249, thence to the bottom of the reservoir 240. The filling should be performed slowly to allow for the time required for seepage through the filter, and may proceed until the lubricant remains stationary up to the inlet 244 at which time the lubricant is up to the level of line $a$—$a$ in pump cylinder 241. Thereupon, the cap 248 is re-applied and effects an air-tight closure.

The operation proceeds substantially as in the case of the embodiment of Fig. 7. The vent holes 252, assuming the oil to be at the level $a$—$a$ in the cylinder 241, will allow any air thereabove to escape as the piston is raised, but inasmuch as said vent holes extend above said level, a distance at least equal to the length of the pump stroke, no oil will escape therethrough.

It is to be understood, of course, that the lubricant pumps shown and described in the present application and covered in the claims hereof may be utilized to supply central lubricating systems other than these utilized upon automobile chassis, and they may be utilized to supply central lubricating systems other than those utilizing measuring valves, as shown and described in Figs. 2 to 5. The pumps may be made of different sizes and proportions than shown, and may be actuated other than manually, as shown in the preferred embodiments.

It is to be understood that there may be many changes and modifications made in the construction and the arrangement of the details of my invention without departing from the scope thereof, and I intend to include all such variations as fall within the scope of the appended claims in this application, in which only certain preferred forms of my invention have been disclosed.

I claim:—

1. In a lubricator, in combination, a reservoir casting having a sloping bottom, a pump cylinder unitary therewith and extending vertically downward below said bottom, a cover for said reservoir, a pump plunger through said cover, a spring coiled about said plunger, reacting at one end against said bottom and at the other against said plunger to normally maintain the latter in uppermost position, so that said cylinder will be normally filled by lubricant draining thereinto from said reservoir, and a cylindrical filtering unit extending about said spring between said bottom and said cover to purify the oil flowing from the reservoir to the cylinder.

2. The combination set forth in claim 1 in which the filter unit comprises a perforated metal cylinder and a cylinder of filter material surrounding the latter.

3. In a lubricator, the combination of a reservoir having a bottom, a pump cylinder axially aligned therewith and extending vertically adjacent said bottom, a cover for said reservoir, a pump plunger connection passing through said cover, a coil spring cooperating with said plunger, reacting at one end against a part rigid with said reservoir to normally maintain the plunger in an upper position and a cylindrical filtering unit extending about said connection located between said bottom and said cover to clean the oil flowing from the reservoir to the cylinder.

4. In a lubricator, in combination, a reservoir having a sloping bottom, a pump block adjacent thereto and extending vertically, a vertical cylinder in said block, an encircling filter unit adjacent said cylinder and an outlet from the bottom of said pump extending upwardly substantially parallel with said cylinder.

5. In a lubricator, in combination, a reservoir tank having a cover, a filling cap associated with said cover, a pump plunger, an actuating connection for said plunger mounted above said cover, a spring urging said plunger to an upper position, a unitary block adjacent the bottom of said reservoir and having a bore therein aligned with said pump plunger and constituting the cylinder therefor and normally in communication with the lower part of said reservoir, an outlet conduit substantially parallel to said cylinder bore, a communicating duct between the bottom of said cylinder bore and said outlet passageway and a plug fixed in the bottom of said plunger bore containing a spring seated outlet valve.

6. In a lubricating installation, in combination, a lubricant reservoir, a lubricant pump including a cylinder extending longitudinally through said reservoir, said pump including a piston below the bottom of said reservoir, a lubricant conduit communicating with the interior of said reservoir from a part laterally of said pump cylinder and delivering lubricant to below said pump piston, said cylinder being perforated above said reservoir bottom to admit lubricant directly thereinto to aid in immersion or priming of the piston.

7. In a lubricating installation, in combination, a reservoir, a pump extending longitudinally thereof, supported in the bottom and positioned by the cover of said reservoir, said pump having a piston normally at the bottom thereof and ports in said pump cylinder at a level between the bottom and cover of said reservoir to maintain the interior of said pump cylinder above said piston filled with lubricant to substantially the level of the lubricant within the reservoir, one of said ports being near the cover, whereby any lubricant raised in pump operation by the piston will flow back through said ports into the reservoir.

8. In a lubricant pump, in combination, a pump cylinder open at the lower end thereof, nozzle means intercepting the discharge from said open cylinder and directing it onward, a piston reciprocable in said cylinder, a rod therefor extending through said cylinder and stop means at the external part of said rod to limit the ejecting stroke of the piston.

9. In a lubricant pump, in combination, a cylinder having an open end, a rod extending longitudinally thereof, said rod having a piston at the lower end thereof, a spring encircling said rod, reacting against the cylinder head and normally urging said piston to the open end of said cylinder, stop means on the operating end of said piston rod and beyond the cylinder head to determine the lowermost position of said piston under spring pressure and means enclosing the open end of the cylinder and in communication with a source of lubricant from which the pump draws its charge, said means having an outlet port through which the pump ejects its charge.

10. A pump for a lubricating system, including a substantially vertical cylinder, a piston therein, a piston rod, operating means therefor, and a downwardly extending hood carried by said rod, normally covering the cylinder head and serving to shed any foreign matter, thereby preventing the entry thereof into the pump cylinder.

11. In a centralized lubricating system for motor vehicles, in combination, a lubricant reservoir fixed below the floorboard of the vehicle, said reservoir having an outlet element through which the pipe line is supplied, a pump extending longitudinally of said reservoir and including a cylinder protruding upward through the floorboard of the vehicle, an operating member manually or pedally actuated, and a downwardly extending hood carried by said operating member and normally covering the cylinder head and serving to shed any foreign matter, thereby preventing the entry thereof into the pump cylinder.

12. In a lubricating system, in combination, a pump, means temporarily storing lubricant under pressure transmitted from the pump, said means taking the form of a chamber including a piston and a spring urging said piston to discharge said chamber, and check valves respectively interposed between the pump plunger and said means and between said means and said system to assure delivery, after return of the pump plunger, of lubricant from said storage means to the bearings.

13. In a lubricator, in combination, a reservoir, a pump supplied therefrom including a cylinder and a plunger, the outlet of said pump cylinder having a check valve, a pressure chamber, said chamber being provided with resilient means stressed when the chamber receives lubricant, and released when the chamber discharges lubricant, said chamber being supplied from said pump when the check valve is open and a second valve at the outlet from said pressure chamber, said pressure chamber being positioned directly alongside of said cylinder.

14. In a lubricating system, in combination, a lubricant reservoir, a pump cylinder unitary therewith, a pump plunger movable in said cylinder and normally in withdrawn position, a pressure bell chamber adjacent said cylinder and rigid therewith, a check valve interposed between said cylinder and said pressure bell and a second valve having a seating pressure greatly in excess of that of said check valve and controlling the outlet from said pressure bell to the apparatus to be lubricated.

15. In a reservoir pump assembly for a centralized lubricating system, in combination, a reservoir, a pump cylinder constituting a part thereof, a pressure bell laterally of said pump cylinder, a pump plunger normally urged to retracted position with respect to said cylinder and affording communication from the reservoir to said cylinder to maintain the latter normally filled, a check valve preventing the return flow from the bell to the cylinder and a second valve having a seating pressure greatly in excess of that of said check valve and in the path of oil ejected to the line from said pressure bell.

16. In a lubricant pump, in combination, a cylinder, a piston therefor, a pressure bell supplied from said cylinder, said bell having a plunger therein, a spring urging said plunger toward the inlet to said bell, a check valve interposed between the outlet of said cylinder and said pressure bell and a second valve having a seating pressure in excess of that of said check valve and controlling the outlet of lubricant from said bell.

17. In a lubricator, in combination, a reservoir, a pump cylinder therewithin and extending therebelow, a pressure bell secured in said reservoir near said pump, a piston in said cylinder, a spring urging said piston toward the end of the cylinder, a check valve in said reservoir at the outlet end of said cylinder, a duct extending from said check valve to said pressure bell and a second valve substantially aligned with said check valve, seated at a materially higher pressure than the said check valve.

18. The combination set forth in claim 17 in in which the pressure bell is provided with a second piston and has an aperture at its otherwise closed end through which lubricant from the reservoir will enter to maintain the second piston primed and from which such lubricant is ejected as the second piston is forced through its stroke in pump operation due to the lubricant being forced into said pressure bell.

19. In combination, a lubricant reservoir having a bottom and a cover, a pump cylinder extending axially of said reservoir, secured at said bottom and positioned by said cover, a filling opening in said cover and a filter through which all lubricant admitted through the cover must pass before it can reach the bottom of the reservoir, said filter comprising a conical fine mesh fabric encircling said cylinder at its upper end and flaring outwardly and a second conical member of larger diameter, securing at its lower end to the first filter member and flaring outwardly to the rim of said reservoir.

20. The combination set forth in claim 19 in which a metal ring secures the filter unit about the pump cylinder and the closure clamps the filter element against the rim of the reservoir.

21. In combination with a centralized chassis lubricating system for a motor vehicle provided with a driver's position, a reservoir secured to said motor vehicle at a position not conveniently accessible from said driver's seat, a pump discharge chamber supported adjacent the bottom of said reservoir and depending downwardly, a piston normally positioned to an end of said pump chamber, a normally open inlet port of said chamber, a coil spring within said reservoir above the piston extending vertically within said reservoir, and solely serving by its reaction against a part rigid with said reservoir to move the piston to its initial position, and a small lubricant compartment adjacent said discharge chamber at the bottom of said reservoir and receiving lubricant from said discharge chamber and provided with inlet and outlet passages, one of which is controlled by a spring seated valve, the outlet passage serving to feed the lubricant from said discharge chamber to said system, said lubricant compartment being positioned alongside of the discharge chamber and extending in part parallelly to said discharge chamber.

22. A lubricator comprising a reservoir having a pump chamber depending from and the upper end of which directly communicates with the bottom of said reservoir, a pump plunger aligned with said chamber, a spring coiled about said plunger positioned above said chamber and normally maintaining it at one extremity of its stroke above said chamber and a cylinder of filtering material in said reservoir positioned above said chamber across the path of flow of lubricant from said reservoir to the upper end of said pump chamber, said plunger, said spring and said cylinder extending from the top to the bottom of the reservoir and to the upper end of said chamber.

23. A lubricator comprising a reservoir having a pump chamber axially aligned therewith adjacent the bottom thereof, a pump plunger aligned therewith, a coil spring operatively connected to said plunger and normally maintaining it at the beginning of its stroke, a cylinder of filtering material in said reservoir across the path of flow of lubricant from said reservoir to said pump chamber and a cylindrical discharge chamber receiving lubricant from said pump chamber, said cylinder of filtering material being at the same level as said reservoir, said pump chamber being below said reservoir and said cylinder and receiving lubricant from said reservoir and said cylindrical discharge chamber being also below said reservoir and receiving lubricant from the lower end of said pump chamber.

24. In a lubricator, in combination, a cylindrical reservoir having a sloping bottom, a vertical pump cylinder having an inlet, the axis of which cylinder coincides with the axis of said reservoir, a cylindrical filter unit enclosing the inlet to said cylinder and a cylindrical outlet extending alongside of and parallel to the pump cylinder and communicating with said pump cylinder adjacent the bottom thereof.

25. In a pressure operated lubricating system, in combination, a reservoir, a cover therefor, a pump cylinder adjacent the bottom, an elongated metallic plunger adapted to fit into said cylinder, operating means for the plunger above the cover, an inlet filter for said cylinder and a cylindrical outlet extending alongside of and parallel to the pump cylinder and communicating with said pump cylinder adjacent the bottom thereof.

26. In combination with a centralized lubricating system for a machine provided with a plurality of spaced bearings, a reservoir secured to said machine, a pump discharge chamber supported adjacent the bottom of said reservoir, a piston normally positioned at one end of said pump chamber, an inlet to said chamber, a coil spring extending vertically within said reservoir and serving by its reaction against a part rigid with said reservoir to move the piston to its normal position, actuating means for causing movement of said piston and for simultaneously stressing said spring to cause a return movement and a small lubricant compartment adjacent said discharge chamber and at the bottom of the reservoir receiving lubricant from said discharge chamber and provided with inlet and outlet passages, at least one of which is provided with a valve, the outlet passage serving to feed the lubricant from said discharge chamber to said system, said compartment extending upwardly from the bottom of said discharge chamber.

27. In combination with a centralized lubricating system for a machine provided with a plurality of spaced bearings, a reservoir secured to said machine, a pump discharge chamber supported adjacent the bottom of said reservoir, a piston normally positioned at one end of said pump chamber, an inlet to said chamber, a coil spring extending vertically within said reservoir and serving by its reaction against a part rigid with said reservoir to move the piston to its normal position, actuating means for causing movement of said piston and for simiultaneously stressing said spring to cause a return movement and a small lubricant compartment adjacent said discharge chamber and at the bottom of the reservoir receiving lubricant from said discharge chamber and provided with inlet and outlet passages, at least one of which is provided with a valve, the outlet passage serving to feed the lubricant from said discharge chamber to said system, said pump discharge chamber and said lubricant compartment both depending downwardly from the bottom of the reservoir and communicating with each other at substantially their lowest points.

28. In combination with a centralized lubricating system for a machine provided with a plurality of spaced bearings, a reservoir secured to said machine, a pump discharge chamber supported adjacent the bottom of said reservoir, a piston normally positioned at one end of said pump chamber, an inlet to said chamber, a coil spring extending vertically within said reservoir and serving by its reaction against a part rigid with said reservoir to move the piston to its normal position, a circular body of filtering material positioned in said reservoir and filtering all lubricant before being admitted to said pump chamber, actuating means for causing movement of said piston and for simultaneously stressing said spring to cause a return movement and a small lubricant compartment adjacent said discharge chamber and at the bottom of the reservoir receiving lubricant from said discharge chamber and provided with inlet and outlet passages, at least one of which is provided with a valve, the outlet passage serving to feed the lubricant from said discharge chamber to said system, said reservoir being of cylindrical shape and said filtering body being concentrically disposed around said piston and within said reservoir.

29. In combination with a centralized lubricating system for a machine provided with a plurality of spaced bearings, a reservoir secured to said machine, a pump discharge chamber supported adjacent the bottom of said reservoir, a piston normally positioned at one end of said pump chamber, an inlet to said chamber, a coil spring extending vertically within said reservoir and serving by its reaction against a part rigid with said reservoir to move the piston to its normal position, actuating means for causing movement of said piston and for simultaneously stressing said spring to cause a return movement and a small lubricant compartment adjacent said discharge chamber and at the bottom of the reservoir receiving lubricant from said discharge chamber and provided with inlet and outlet passages, at least one of which is provided with a valve, the outlet passage serving to feed the lubricant from said discharge chamber to said system, said chamber and said compartment being both cylindrical and in part at least having parallel vertical axes and being positioned side by side.

30. In combination with a centralized lubricating system for a machine provided with a plurality of spaced bearings, a reservoir secured to said machine, a pump discharge chamber supported adjacent the bottom of said reservoir, a piston normally positioned at one end of said pump chamber, an inlet to said chamber, a coil spring extending vertically within said reservoir and serving by its reaction against a part rigid with said reservoir to move the piston to its normal position, actuating means for causing movement of said piston and for simultaneously stressing said spring to cause a return movement and a small lubricant compartment adjacent said discharge chamber and at the bottom of the reservoir receiving lubricant from said discharge chamber and provided with inlet and outlet passages, at least one of which is provided with a valve, the outlet passage serving to feed the lubricant from said discharge chamber to said system, said compartment being provided with inlet and outlet valves positioned in said passages.

31. In combination with a centralized lubricating system for a machine provided with a plurality of spaced bearings, a reservoir secured to said machine, a pump discharge chamber supported adjacent the bottom of said reservoir, a piston normally positioned at one end of said pump chamber, an inlet to said chamber, a coil spring extending vertically within said reservoir and serving by its reaction against a part rigid with said reservoir to move the piston to its normal position, actuating means for causing movement of said piston and for simultaneously stressing said spring to cause a return movement and a small lubricant compartment adjacent said discharge chamber and at the bottom of the reservoir receiving lubricant from said discharge chamber and provided with inlet and outlet passages, at least one of which is provided with a valve, the outlet passage serving to feed the lubricant from said discharge chamber to said system, the inlet to the discharge chamber being closed by the piston upon discharge movement thereof and being opened upon removal of said piston out of said inlet upon reverse movement thereof, the entire upper end of said pump discharge chamber constituting said inlet and said upper end opening into said reservoir.

JOSEPH BIJUR.